US006983389B1

(12) United States Patent
Filippo

(10) Patent No.: US 6,983,389 B1
(45) Date of Patent: *Jan. 3, 2006

(54) CLOCK CONTROL OF FUNCTIONAL UNITS IN AN INTEGRATED CIRCUIT BASED ON MONITORING UNIT SIGNALS TO PREDICT INACTIVITY

(75) Inventor: Michael A. Filippo, Manchaca, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 620 days.

This patent is subject to a terminal disclaimer.

(21) Appl. No.: 10/061,671

(22) Filed: Feb. 1, 2002

(51) Int. Cl.
*G06F 1/32* (2006.01)
(52) U.S. Cl. ...................... 713/324; 713/322
(58) Field of Classification Search ................ 326/56; 326/ 712/220; 713/322, 324
See application file for complete search history.

(56) References Cited

U.S. PATENT DOCUMENTS

| 4,748,585 | A | | 5/1988 | Chiarulli et al. | |
|---|---|---|---|---|---|
| 5,287,292 | A | | 2/1994 | Kenny et al. | |
| 5,490,059 | A | | 2/1996 | Mahalingaiah et al. | |
| 5,781,783 | A | * | 7/1998 | Gunther et al. | 713/320 |
| 5,915,232 | A | | 6/1999 | McMinn | |
| 5,951,689 | A | | 9/1999 | Evoy et al. | |
| 5,987,616 | A | * | 11/1999 | Suzuki | 713/320 |
| 6,098,030 | A | | 8/2000 | McMinn | |
| 6,138,232 | A | * | 10/2000 | Shiell et al. | 712/244 |
| 6,202,163 | B1 | * | 3/2001 | Gabzdyl et al. | 713/324 |
| 6,219,796 | B1 | * | 4/2001 | Bartley | 713/320 |
| 6,380,760 | B1 | * | 4/2002 | Pappert | 326/56 |
| 6,501,300 | B2 | * | 12/2002 | Hatae | 326/93 |
| 6,581,571 | B2 | * | 6/2003 | Kubesh et al. | 123/406.44 |

FOREIGN PATENT DOCUMENTS

DE              1 409 466         10/1975

OTHER PUBLICATIONS

Luca Benini and Giovanni De Micheli, "System-Level Power Optimization: Techniques and Tools", ACM Transactions on Design Automation and of Electronic Systems, vol. 5, No. 2, Apr. 2000.*

(Continued)

*Primary Examiner*—Thomas Lee
*Assistant Examiner*—Albert Wang
(74) *Attorney, Agent, or Firm*—Robert C. Kowert; Meyertons, Hood, Kivlin, Kowert & Goetzel, P.C.

(57) ABSTRACT

An integrated circuit may have separate clock control for a number of different functional units. Ancillary to some of the functional units may be an activity detector and clock control unit which monitors input to its functional unit to determine when the functional unit will be inactive. When an activity detector and clock control unit determines that a particular functional unit is or will be inactive, it may disable clocking to its functional unit while the functional unit is inactive. When activity detector and clock control unit determines that activity will resume for its functional unit, it enables clocking to its functional unit. Thus, the activity detector and clock control unit for each such functional unit functions to control clocking to its respective functional unit so that during periods of inactivity, inactive functional units are not clocked to reduce the overall static and/or dynamic power consumption for the integrated device.

15 Claims, 7 Drawing Sheets

OTHER PUBLICATIONS

"Methodologies for Measuring Temperature on AMD Athlon and AMD Duron Processors," AMD, Publication #24228, Rev: E, Jan. 2003, pp. 1-42.

"AMD PowerNow!", AMD, 2002, 3 pages.

"AMD Athlon XP Processor Model 6 Data Sheet," AMD, Publication #24309, Rev: E, Mar. 2002, 5 pages.

"AMD Thermal, Mechanical, and Chassis Cooling Design Guide," AMD, Nov. 2002, Publication #23794, Rev. H, 30 pages.

"Intel SpeedStep Technology Backgrounder," Intel, 3 pages.

"QuickStart Technology: Saving Power Between Keystrokes," James R. Quaranta, Jr., Apr. 24, 2000, 2 pages.

"PC Energy-Efficiency Trends and Technologies," Intel Corporation, 2002, pp. 1-8.

IBM, "Superscalar Processor Architecture Using Flexible Execution Unit," IBM Technical Disclosure Bulletin, vol. 37, No. 028, Feb. 1994, pp. 699-702.

* cited by examiner

CLOCK CONTROL OF FUNCTIONAL UNITS IN AN INTEGRATED CIRCUIT BASED ON MONITORING UNIT SIGNALS TO PREDICT INACTIVITY

BACKGROUND OF THE INVENTION

1. Field of the Invention

This invention relates to power management within integrated circuits, and more particularly to monitoring activity for different functional units of an integrated circuit for power management.

2. Description of the Related Art

Some of the factors contributing to overall power consumption within an integrated circuit are dynamic power consumption, (power consumption caused by capacitive charging during the switching of a transistor) and static power, (power caused by leakage current through a transistor in the off state). The power and thermal constraints placed on modern semiconductor devices are rapidly becoming a limiting factor to the performance and functionality available in a single device. VLSI (Very Large Scale Integration) and extreme high clock speeds have become the norm. The high clock speeds are to drive the integrated circuit faster to perform its respective job faster, and the faster the integrated circuit operates the more the more power it typically consumes. Integrated circuits must also efficiently dissipate the heat generated from consuming power during operating. If the heat is not efficiently dissipated, then the semiconductor material that makes up the integrated circuit may continue to increase in temperature which could lead to malfunction, device damage, thermal runaway, etc. Thermal runaway is where the device will continue to increase in heat and power consumption until it eventually and permanently fails. Thermal problems may lead to actual breakdown of one or more of the device junctions in the semiconductor material.

Integrated circuits now contain more semiconductor devices than ever before due extreme integration. The more semiconductor devices that are contained in an integrated circuit for example, the greater the power consumption and need for efficient heat dissipation. Even with all of the technological advances made in integrated circuits, problems still arise from an increasing need to miniaturize and increase the density in already crowded semiconductor die. Due to miniaturization within an integrated circuit, features are finer. Increasing density means that there is more combined heat that must be dissipated in a smaller area.

Power supply size is proportional to the amount of power that must be supplied. Thus, lower power requirements lead to smaller power supplies. Where the application dictates the use of a battery for a power source or an alternate power source, the circuitry may sustain an increased battery life if power consumption is reduced. Likewise, in an application where the power source is contained on the same printed circuit board as the system logic, less PCB real estate may be necessary because the physical size of the power source is reduced.

Because today's integrated circuits actually have more functionality, they have a denser population and dissipate more heat per square inch than ever before, requiring new and innovative ways to dissipate this additional heat faster. If power consumption and heat related problems cannot be addressed, a device may have to be operated at a lower frequency or at a lower voltage or include fewer devices than desired to reduce power consumption and avoid thermal problems.

Excessive heat also affects the characteristics of other non-silicon materials used in the design and assembly of electronic equipment today. Due to cost-reducing steps that may be taken, some materials that are used in today's equipment may not withstand the excessive heat generated within that equipment. For example, certain types of plastic, rubber, vinyl, and adhesive may deteriorate and/or warp when exposed to excessive heat, possibly affecting the fit, form or functionality of the equipment. Thus, there is a need to dissipate heat faster and lower the average operating temperature of a device. Many methods are used to improve heat dissipation and all are effective to some degree.

Problems associated with excessive heat may be addressed by using one or more heat sinking and cooling techniques at the IC (integrated circuit) and component level. These techniques may solve some of the problem, but may not lend themselves to every application. One example of an IC level cooling technique is the process of making certain leads that extend out of the IC much larger than others so that the enlarged leads effectively increase the square area of the total heat-transferring real estate, thus conducting heat away from the IC faster. Although enlarging the leads on an IC may provide some heatsink capability, this technique may not apply to all package types and there are physical limitations to the size the leads may be. Heat-transferring characteristics are directly proportional to the cross sectional area of a heat transferring device. Heatsinks may be mounted to an integrated circuit, often with the help of thermal transfer compound and a clamp. If more cooling is required, a fan may be mounted to the heatsink to improve heat dissipation. Using two methods in conjunction, for example, mounting a heat sink to an integrated circuit and mounting a fan on top of it, is a common practice. However, heatsinks and fans generally take up valuable space and add cost in a system.

Another method may be to attach a thermoelectric semiconductor device called a frigistor to an integrated circuit or a bank of integrated circuits. Due to the Peltier effect, the frigistor will refrigerate the circuitry to a desired temperature. When the electric current flows form the negative element to the positive element, the top electrode of the N-type junction moves from a low energy level to a high energy level, thereby lowering the temperature. Conversely, the temperature of the lower electrode rises because it passes form a high energy level to a low energy level. The temperature may be controlled many ways, most common of which is using a thermocouple and a switching circuit that turns the cooling device on and off. These devices may not be cost effective in some designs where cost is an issue.

Many conventional power management techniques may become inadequate in designs where space constraints are present within the equipment. Power consumption may become more of an issue because of the physical size of the power supply and battery life. Thus, reducing the amount of power that is actually consumed may be more desirable then trying to figure out how to cool integrated circuits by using larger and larger heat-sinking apparatuses.

Power management software is one method that may be used to reduce power at the system level. Power management software is intended to reduce the power consumed by high power consumption device in a system, such as a handheld or laptop device.

One conventional technique used to reduce power consumption within an integrated circuit is to design as much of the functional block of the IC as possible to operate on lower operating voltages, which reduces power consumption. While this technique may be effective, it may only be feasible in some applications. Other parts of the circuitry may need increased voltage to fulfill circuitry requirements, thus requiring multiple power sources. For example, this may be accomplished by using an integrated circuit and an output driver coupled to a first voltage supply and a level shifter circuit coupled to a second voltage supply.

Another method of reducing power consumption is to operate an integrated circuit at a lower frequency. However, performance goals may not be met at a lower frequency. Other methods to reduce power consumption may be to reduce the functionality of the circuitry so that fewer transistors are used. Even though this type of sacrifice reduces power consumption, it may result in a design that does not meet performance and functionality goals.

SUMMARY

In one embodiment, ancillary to a number of functional units in an integrated circuit is an activity detector and clock control unit. The activity detector and clock control unit may receive and monitor some or all of the input for the functional unit with which it is associated to determine when the functional unit will be inactive. For example, an activity detector and clock control unit may monitor certain control signals received by its functional unit that indicate current or future activity for the functional unit. Each functional unit also receives its clock (or clocks) from its associated activity detector and clock control unit. Thus, each functional unit is not clocked by a global device clock source, but is instead clocked under the control of an activity detector and clock control unit. Each activity detector and clock control unit receives a global clock, e.g. from a device clock tree.

When an activity detector and clock control unit determines that a particular functional unit is or will be inactive, it may disable clocking to its functional unit while the functional unit is inactive. When an activity detector and clock control unit determines that activity will resume for its functional unit, it enables clocking to its functional unit. Thus, the activity detector and clock control unit for each functional unit functions to control clocking to its respective functional unit so that during periods of inactivity, inactive functional units are not clocked to reduce the overall static and/or dynamic power consumption for the integrated device. For each functional unit that has an associated activity detector and clock control unit, clocking is controlled separately.

In some embodiments, an activity detector and clock control unit for a particular functional unit may determine or predict how long the functional unit will be inactive and only disable clocking to the functional unit if the functional unit will be inactive for a threshold amount of time, clock cycles, instructions, etc. In some embodiments this threshold amount may be programmable for each functional unit. Similarly, in some embodiments, an activity detector and clock control unit for a particular functional unit may only disable clocking to the functional unit if the functional unit has already been inactive for a threshold amount of time, clock cycles, instructions, etc.

In another embodiment, an activity detector and clock control unit monitors a functional unit's control signals or inputs to determine when (and possibly for how long) the functional unit will be inactive. This activity detector may be performed by monitoring control signals or by monitoring the flow of data across boundaries of the functional unit or monitoring an instruction stream to the functional unit or any other signal(s) that can be observed to determine when the functional unit will be inactive. In some embodiments, the activity detector and clock control unit may monitor both inputs and outputs to a functional unit in order to determine when the functional unit will be inactive. For example, particular outputs from a functional unit may indicate an operating state of inactivity in the future for the functional unit.

In other embodiments, the activity detector and clock control unit for a particular functional unit may monitor signals or data at another stage or a functional unit within a device in order to determine when its associated functional unit will be inactive. For example, in an integrated device in which functional units are organized in a pipelined architecture, the activity detector and clock control unit may monitor signals or data at an earlier pipeline stage to predict the activity for its functional unit which may be in a later stage of the pipeline.

The activity detector may receive some or all of inputs for a particular functional unit. In some embodiments the inputs received by activity detector may be different from inputs received by its corresponding functional unit, but still provide an indication of current or future activity for its functional unit. In some embodiments an activity detector may include a counter to determine when the corresponding functional unit has been inactive for a certain number of clock cycles, instruction cycles, etc. In one type of embodiment, the activity detector is also configured to determine when activity resumes or is about to resume for its corresponding functional unit.

According to one embodiment, the activity detector and clock control unit may include an activity detector and a clock gate. The clock gate may be any device suitable for controlling the supply of one or more clock signals to a functional unit. For example, a clock gate may be simply a pass transistor controlled by an activity detector.

According to another embodiment of the present invention, an activity detector may detect activity for two or more functional units and control separate clock control units for each functional unit. The activity detector monitors some or all inputs for two or more functional units. In other embodiments, the activity detector may additionally or alternatively monitor signals from other portions of the device that allow it to determine activity for two or more particular functional units. The activity detector controls a separate clock gate for each of the functional units for which it monitors activity. When the activity detector determines that one or more of the functional units for which it monitors activity will be inactive, it controls the appropriate clock control units to shut off clocking to the functional units that are inactive.

In an embodiment, where an integrated device may be a microprocessor the clock-controlled functional units correspond to execution units of the microprocessor. The microprocessor may include an instruction fetch and decode unit configured to fetch instructions from memory or an instruction cache, for example, and fully or partially decode the instructions, as is done in typical microprocessor designs. The decoded instruction stream may be received by an instruction window/scheduler which buffers and schedules instructions for the integer execution unit and the floating point execution unit. The instruction scheduler unit may determine which instructions are integer instructions to be operated on by the integer execution unit, and which instruction points are floating point instructions to be operated on by the floating point unit.

Clocking is controlled separately to the integer execution unit and floating point execution unit. The microprocessor includes an integer activity detector unit and a floating-point activity detector unit. These activity detector units correspond to activity detector and clock control units, described above. The integer activity detector unit determines when the integer execution unit will be inactive and shuts off clocking to the integer execution unit when it is inactive. Similarly, the floating-point activity detector unit determines when the floating-point execution unit is inactive and shuts off clocking to the floating-point execution unit during its periods of inactivity. Clocking is reestablished to the integer execution unit and/or floating point execution unit when activity is detected by either the floating-point activity detector unit and/or the integer activity detector unit.

Figure 1:
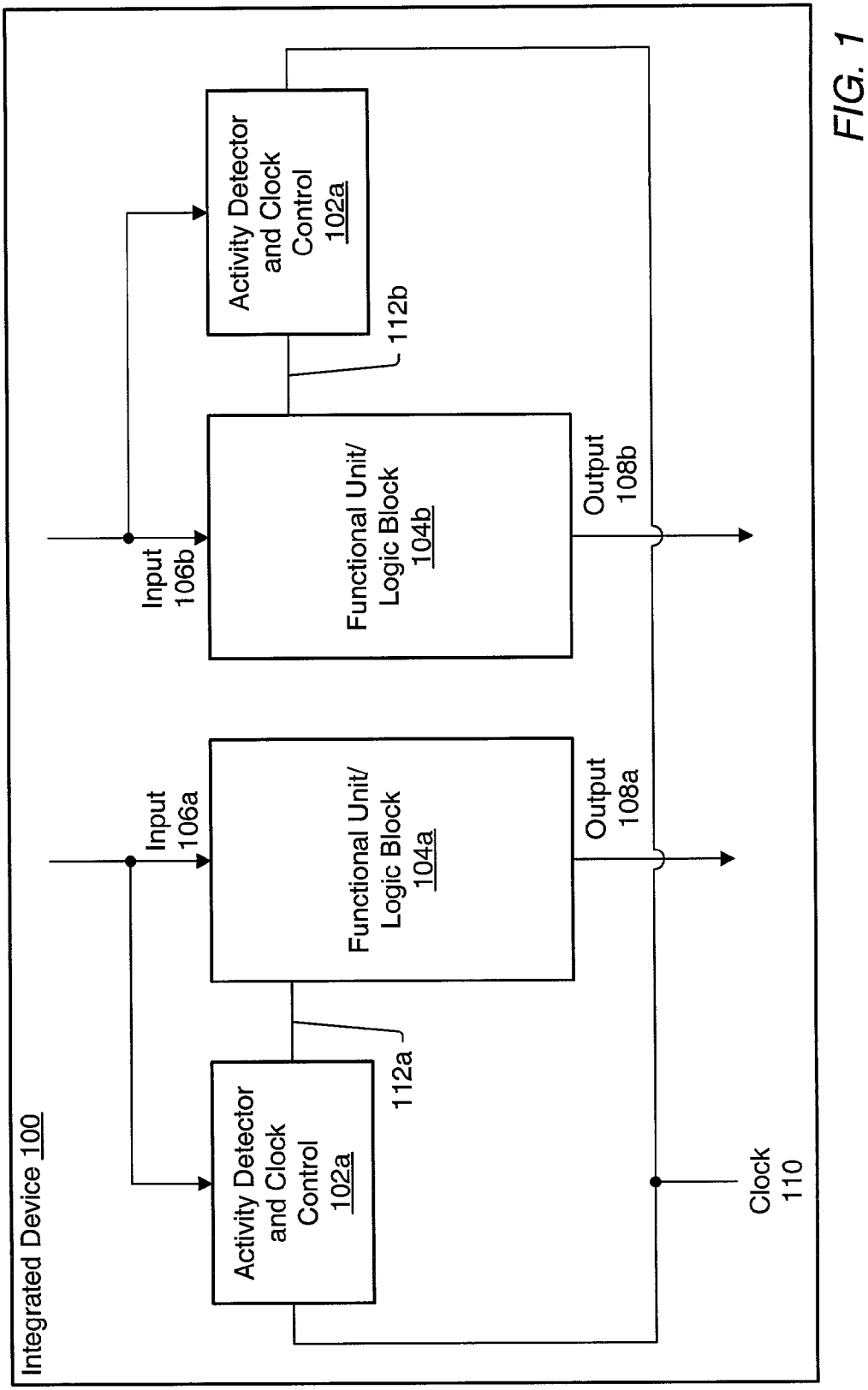
FIG. 1 illustrates a semiconductor device or integrated circuit having separate clock control for a number of different functional units or logic blocks, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIG. 1 illustrates a semiconductor device or integrated circuit 100 having separate clock control for a number of different functional units or logic blocks 104, according to one embodiment. The device 100 includes a number of different functional units or logic blocks 104. Each functional unit 104 receives one or more input signals 106 and produces one or more outputs 108. A functional unit may be a section of circuitry or other logic structure within the integrated circuit 100 that perform a particular function or task. Each function unit 104 represents a portion of the integrated circuit 100 that is not always active. For example, while functional unit 104a is operating on input 106a to produce output 108a, functional unit 104b may be inactive, and vice versa. In some instances function unit 104a and 104b may both be inactive or both be active. Note that while FIG. 1 only illustrates two functional units 104a and 104b, integrated circuit device 100 may have more than two functional units wherein each functional may or may not be active while one or more of the other functional units is active. The integrated device 100 may include other functional units as well, including functional units that are always active.

Note also that while input 106a and input 106b are illustrated as separate inputs, in some embodiments functional units may share common inputs, such as a common data bus. Similarly, some or all of the output 108 generated by each functional unit may or may not be shared by other functional units. In some embodiments the output 108 of some functional units may form some or all of the input 106 to other functional units. In general, a functional unit 104 is a portion of the integrated circuit device that may be inactive while one or more other functional units are active within the integrated circuit device.

Ancillary to some of the functional units 104 may be an activity detector and clock control unit 102. The activity detector and clock control unit 102 may receive some or all of the input 106 for the functional unit 104 with which it is associated. For example, activity detector and clock control unit 102a may receive some or all of input 106a. The activity detector and clock control unit 102 monitors some or all of input 106 to its functional unit to determine when the functional unit will be inactive. For example, activity detector and clock control unit 102 may monitor certain control signals received by its functional unit 104 that indicate current or future activity for the functional unit 104. Each such functional unit 104 also receives its clock (or clocks) 112 from its associated activity detector and clock control unit 102. Thus, each such functional unit is not clocked by a global device clock source, but is instead clocked under the control of activity detector and clock control unit 102. Each activity detector and clock control unit 102 receives device clock (or clocks) 110. Device clock 110 may be a global clock source for integrated device 100, such as a clock signal(s) received from an external clock pin(s) of the integrated device or an internally generated and distributed clock(s) for the integrated device 100.

When an activity detector and clock control unit 102 determines that a particular functional unit 104 is or will be inactive, it may disable some or all clocking to its functional unit 104 while the functional unit is inactive. When activity detector and clock control unit 102 determines that activity will resume for its functional unit 104, it enables clocking to its functional unit 104. Thus, the activity detector and clock control unit 102 for each such functional unit functions to control clocking to its respective functional unit 104 so that during periods of inactivity, inactive functional units are not clocked to reduce the overall static and/or dynamic power consumption for integrated device 100. Since each such functional unit 104 has an associated activity detector and clock control unit 102, clocking is controlled separately for each such functional unit 104.

In some embodiments, an activity detector and clock control unit 102 for a particular functional unit 104 may determine or predict how long the functional unit 104 will be inactive and only disable clocking to the function unit 104 if the functional unit 104 will be inactive for a threshold amount of time, clock cycles, instructions, etc. In some embodiments this threshold amount may be programmable for each such functional unit 104. Similarly, in some embodiments, an activity detector and clock control unit 102 for a particular functional unit 104 may only disable clocking to the function unit 104 if the functional unit 104 has already been inactive for a threshold amount of time, clock cycles, instructions, etc.

An activity detector and clock control unit 102 may monitor a functional unit's control signals or inputs to determine when (and possibly for how long) the function unit will be inactive. This activity detection may be performed by monitoring control signals or by monitoring the flow of data across boundaries of the functional unit or monitoring an instruction stream to the functional unit or any other signal(s) that can be observed to determine when the functional unit will be inactive. In some embodiments, the activity detector and clock control unit 102 may monitor both inputs and outputs to a functional unit in order to determine when the functional unit will be inactive. For example, particular outputs from a functional unit may indicate an operating state of inactivity in the future for the functional unit. In other embodiments, the activity detector and clock control unit 102, for a particular functional unit 104, may monitor signals or data at another stage or functional unit within device 100 in order to determine when its associated functional unit 104 will be inactive. For example, in an integrated device in which functional units are organized in a pipelined architecture, the activity detector and clock control unit 102 may monitor signals or data at an earlier pipeline stage to predict the activity for its functional unit 104, which may be in a later stage of the pipeline.

Figure 2:
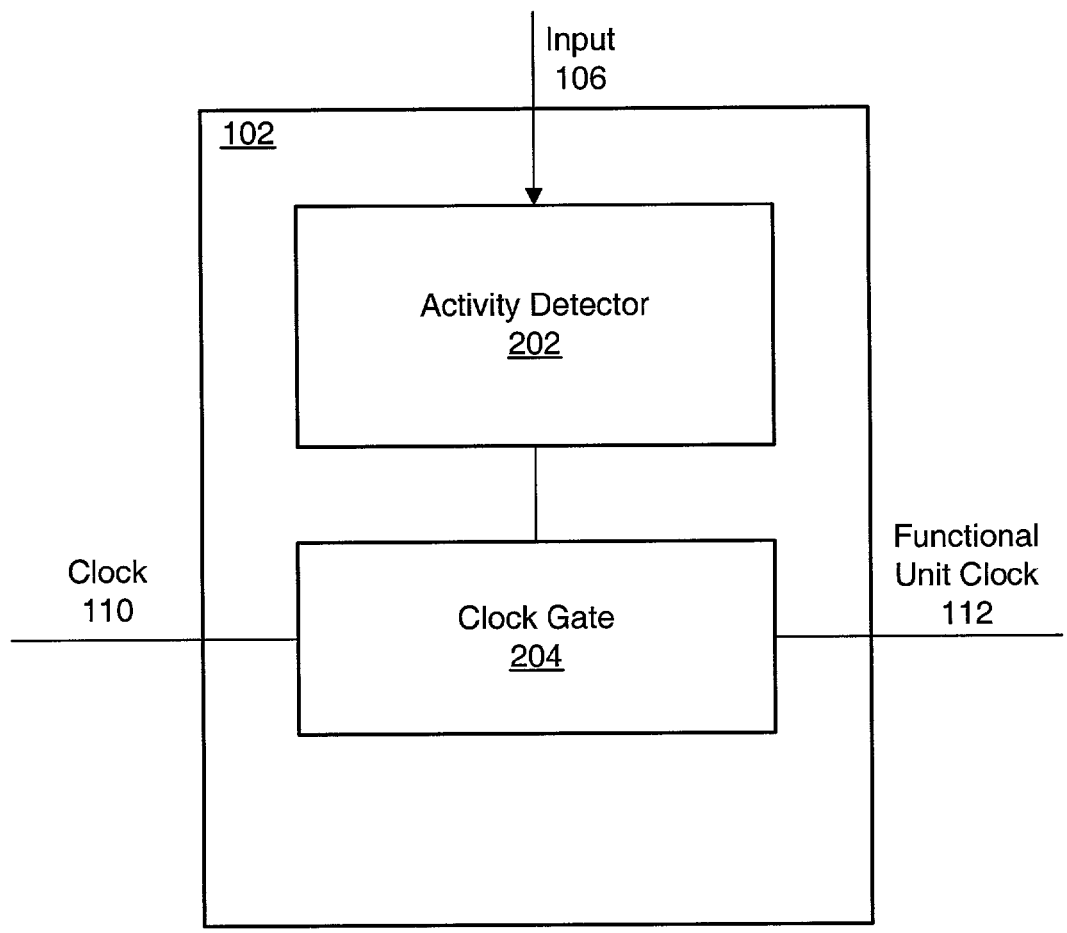
FIG. 2 illustrates an activity detector and clock control unit, according to one embodiment.

Turning now to FIG. 2, an activity detector and clock control unit 102 is illustrated according to one embodiment. The activity detector and clock control unit 102 may include an activity detector 202 and a clock gate 204. The activity detector 202 may receive some or all of inputs 106 for a particular functional unit 104. In some embodiments the inputs 106 received by activity detector 202 may be different from inputs received by its corresponding functional unit 104, but still provide an indication of current or future activity for its functional unit 104. Activity detector 202 may include circuitry, state machines, or other logic structures configured to monitor inputs 106 to determine when its corresponding function unit 104 will be inactive. In some embodiments activity detector 202 may include a counter to determine when the corresponding functional unit 104 has been inactive for a certain number of clock cycles, instruction cycles, etc. Activity detector 202 is also configured to determine when activity resumes or is about to resume for its corresponding functional unit 104.

Activity detector and clock control unit 102 also includes clock gate 204. Clock gate 204 is controlled by activity detector 202 and functions as a gate or switch between core or main clock 110 and functional unit clock 112. Functional unit clock 112 is the clock source for the functional unit 104 associated with the activity detector and clock control unit 102. When activity detector 202 determines that its associated functional unit 104 will be inactive for a sufficient amount of time (e.g. for at least a threshold amount), it controls clock gate 204 to shut off clocking to its associated functional unit 104. When activity detector 202 determines that activity for the associated functional unit 104 will resume, it controls clock gate 204 to enable clocking to the functional unit 104. Clock gate 204 may be any device suitable for controlling the supply of one or more clock signals to the functional unit 104. For example, clock gate 204 may be simply one or more pass transistors controlled by activity detector 202.

Figure 3:
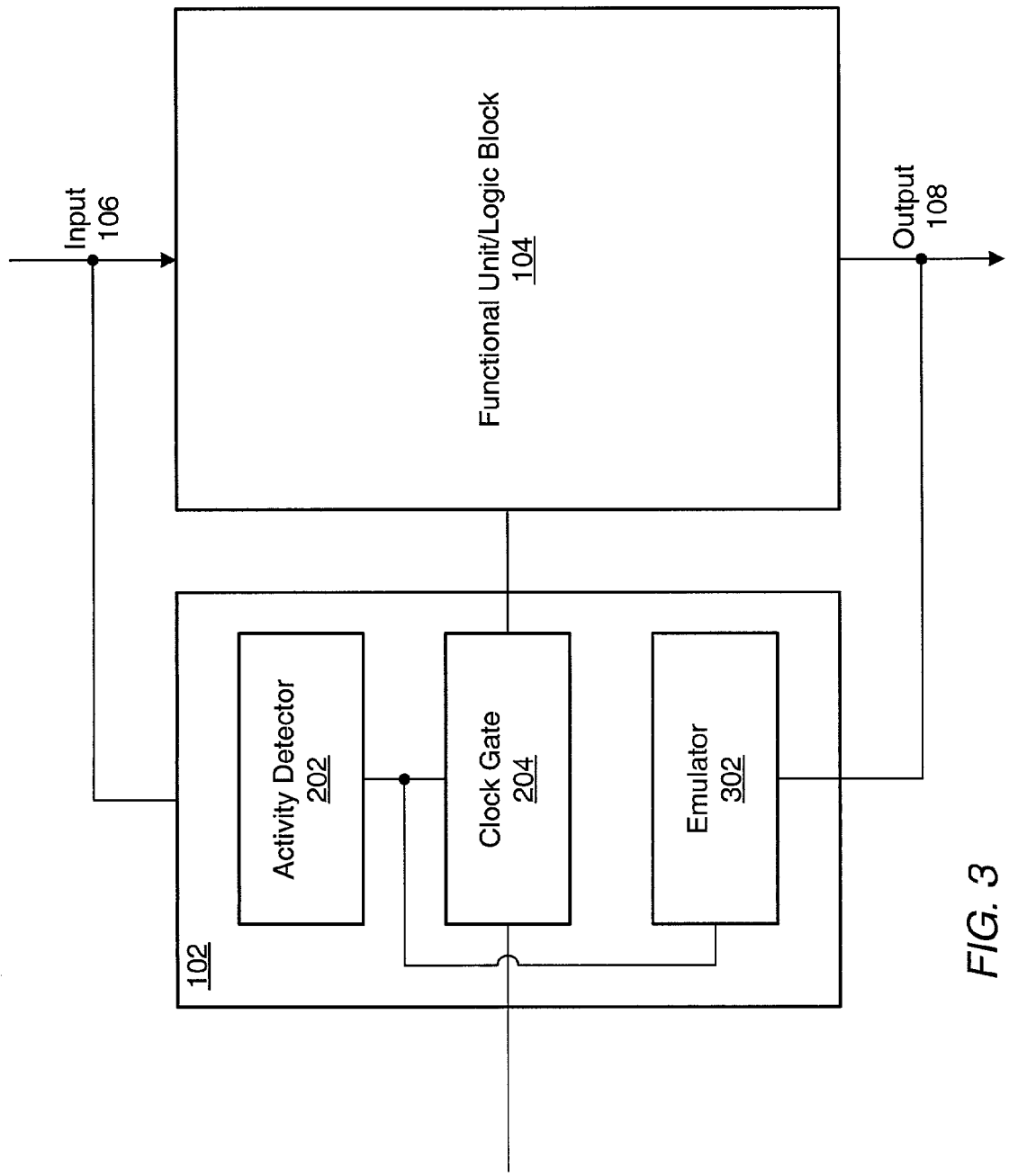
FIG. 3 illustrates a block diagram of an activity detector and clock control unit for controlling clocking to an associated functional unit, according to one embodiment.

Turning now to FIG. 3, another embodiment of an activity detector and clock control unit 102 is illustrated for controlling clocking to an associated functional unit 104. The activity detector and clock control unit 102 includes an activity detector 202 and clock gate 204, as described above in regard to FIG. 2. The activity detector and clock control unit 102 may also include a functional unit emulator 302. The functional unit emulator 302 is configured to emulate the output of functional unit 104 at a neutral state that will not affect the correctness of operation for any other functional unit in device 100 that may receive the output 108 from this functional unit 104. For example, in some designs if clocking is shut off to a functional unit 104, its outputs may go to an undefined state that may provide erroneous data or signals to another functional unit in device 100. To prevent erroneous operation of other functional units when a functional unit 104 is inactive and not clocked, emulator 302 may drive the functional unit's 104 output 108 to a safe state so that the correctness of operation for other functional units will not be affected. In other embodiments, each functional unit 104 may be configured so that when not clocked its outputs are still pulled to a safe state. In such embodiments emulator 302 may not be needed.

Figure 4:
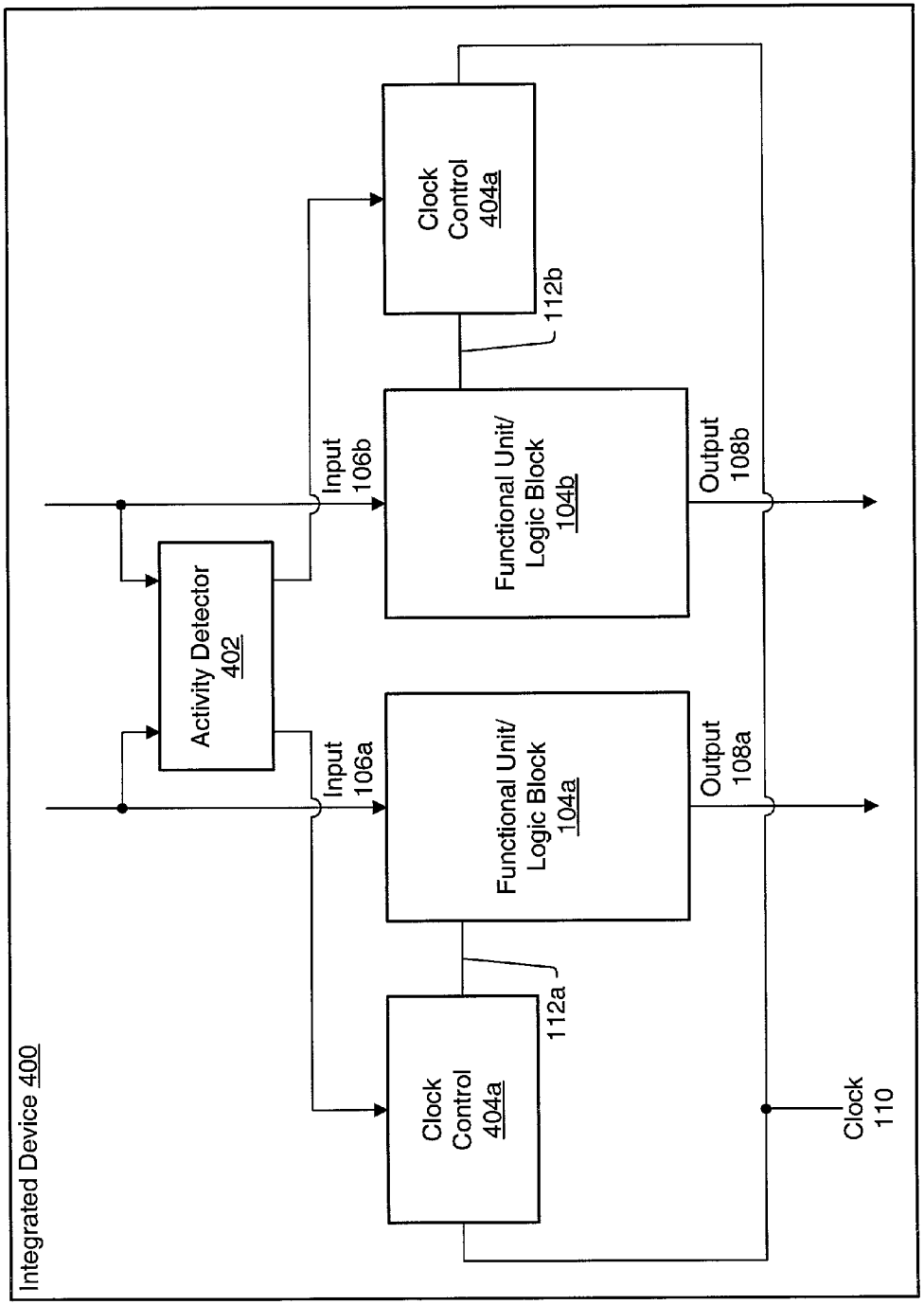
FIG. 4 illustrates an integrated device according to another embodiment in which an activity detector may detect activity for two or more functional units and control separate clock control units for each functional unit.

Turning now to FIG. 4, an integrated device 400 is illustrated according to another embodiment of the present invention in which an activity detector 402 may detect activity for two or more functional units 104 and control separate clock control units 404 for each functional unit 104. Activity detector 402 monitors some or all inputs 106 for two or more functional units 104. In other embodiments activity detector 402 may additionally or alternatively monitor signals from other portions of device 400 that allow it to determine activity for two or more particular functional units 104. Activity detector 402 controls a separate clock gate 404 for each of the functional units 104 for which it monitors activity. When activity detector 402 determines that one or more of the functional units for which it monitors activity will be inactive, it controls the appropriate clock control units 404 to shut off clocking to the functional units 104 that are inactive. Thus, activity detector 402 may function as described in regard to FIGS. 1–3 except that it provides activity detector for more than one functional unit 104 and controls separate clock control units 404 for each functional unit.

Figure 5:
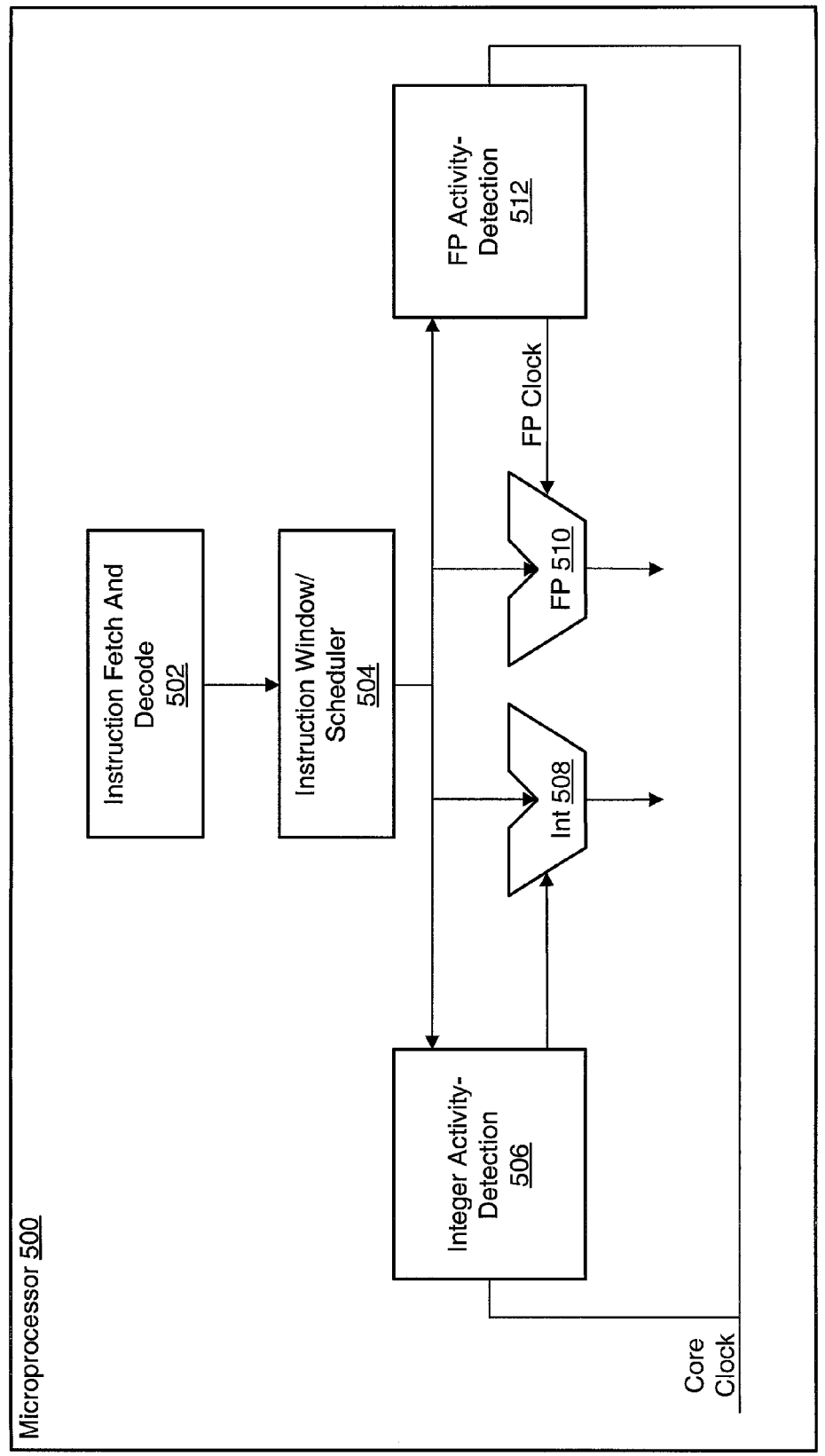
FIG. 5 illustrates an embodiment in which the integrated device is a microprocessor and the clock-controlled functional units correspond to execution units of the microprocessor.

Turning now to FIG. 5 an embodiment is illustrated in which the integrated device is a microprocessor 500 and the clock-controlled functional units correspond to execution units of the microprocessor. Microprocessor 500 may include an instruction fetch and decode unit 502 configured to fetch instructions from memory or an instruction cache, for example, and fully or partially decode the instructions, as is done in typical microprocessor designs. The decoded instruction stream may be received by an instruction window/scheduler 504 which buffers and schedules instructions for integer execution unit 508 and floating point execution unit 510. Instruction scheduler 504 may determine which instructions are integer instructions to be operated on by integer execution unit 508, and which instruction points are floating point instructions to be operated on by floating point unit 510. Note that in some embodiments microprocessor 500 may be a superscalar microprocessor in which integer execution unit 508 may include multiple integer execution units operating in parallel, as is known in the art.

Clocking is controlled separately to integer execution unit 508 and floating point execution unit 510. Microprocessor 500 includes and integer activity detector unit 506 and a floating point activity detector unit 512. These activity detector units correspond to activity detector and clock control units 102, described above. Integer activity detector unit 506 determines when integer execution unit 508 will be inactive and shuts off clocking to the integer execution unit 508 when it is inactive. Similarly, floating point activity detector unit 512 determines when floating point execution unit 510 is inactive and shuts off clocking to floating point execution unit 510 during its periods of inactivity.

Computer program code operated on by microprocessor 500 may be coded so that activity is often required in only one of the execution units at a time. For example, typical computer programs operated on by microprocessor 500 may include large sections of integer code for which integer execution unit 508 is active, but not floating point execution unit 510. Similarly, a program may include sections of floating point code in which floating point execution unit 510 is active while integer instruction execution unit 508 is inactive. Note that in some programs both integer code and floating point code may be intermixed or the two types of code may frequently be interspersed so that both integer execution unit 508 and floating point execution unit 510 are active concurrently. However, for many programs the execution units are rarely active concurrently.

In some embodiments integer activity detector unit 506 will only shut off clocking to integer execution unit 508 if integer execution unit 508 will be inactive for a certain number of clock cycles or instruction cycles. Floating point activity detector unit 512 may operate similarly. Other activity detector and clock control units may be included in microprocessor 500 for other functional units within the microprocessor. For example, microprocessor 500 may include a microcode unit for supplying microcoded instruction sequences to the execution units. If no microcoded instructions are about to be executed (e.g. no microcoded instructions in the instruction pipeline), then clocking may be disabled to the microcode unit of microprocessor 500. Similarly, clocking may be separately controlled to other control and data path structures of the microprocessor according to their level of activity.

Figure 6:
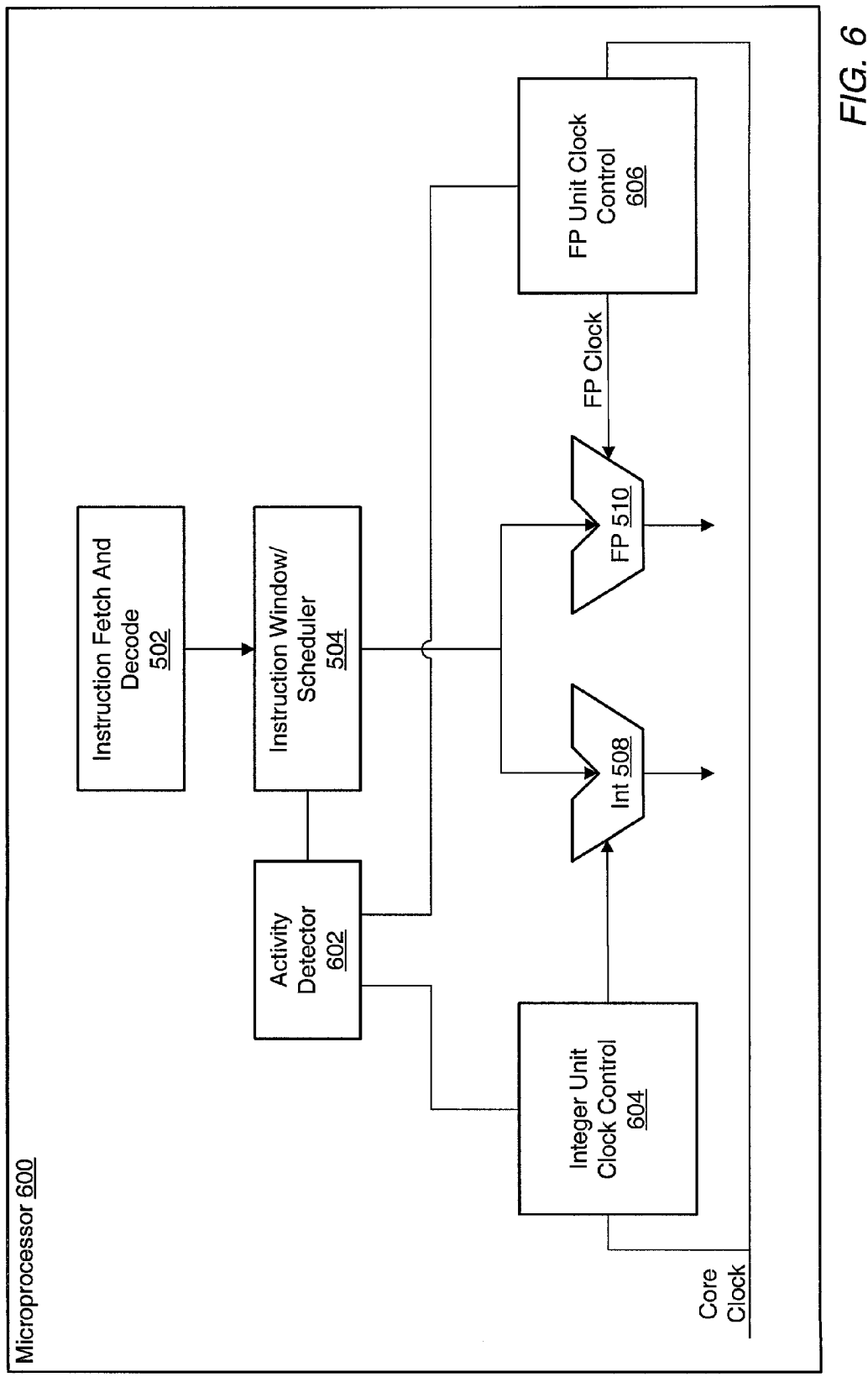
FIG. 6 illustrates an embodiment for a microprocessor in which an activity detector is associated with an instruction scheduler.

Turning now to FIG. 6, an embodiment of a microprocessor 600 is illustrated in which an activity detector 602 is associated with an instruction scheduler 504. Activity detector 602 controls an integer unit clock controller 604 and a floating-point unit clock controller 606. Thus, instead of a separate activity detector for each different execution unit, activity detector 602 may detect activity for both the integer execution 508 and the floating point execution unit 510. Since instructions for both execution units are scheduled by scheduler 504, activity detector 602 may monitor the instructions at this point to determine which execution unit will be active or inactive. Activity detector 602 may examine the instruction stream one or more instructions in advance or entire portions of the instruction stream to determine when each execution unit will be inactive and/or how long each execution will be inactive. For example, if activity detector unit 602 detects that none of the next twelve instructions are floating point instructions it may instruction floating point unit clock controller 606 to shut off clocking to floating point execution unit 510 (note that twelve instructions is merely an arbitrary example). In some embodiments activity detector 602 may examine the instruction stream and make branch predictions or look for particular instruction sequences to determine whether or not a particular execution unit will be or is likely to be inactive.

Figure 7:
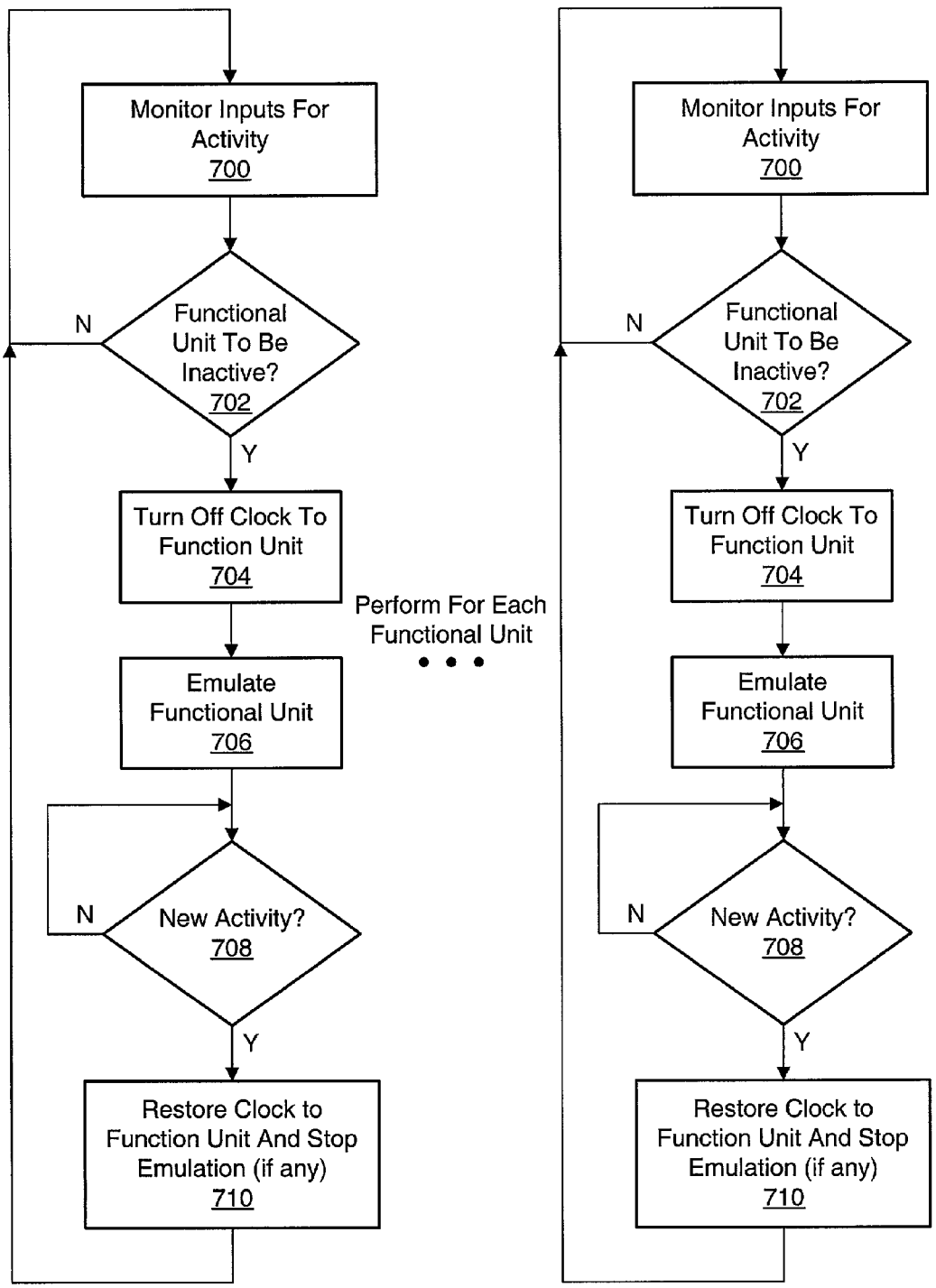
FIG. 7 is a flow chart of a method for reducing power consumption in an integrated circuit comprising a plurality of functional units, according to one embodiment.

Turning now to FIG. 7, a method for reducing power consumption in an integrated circuit in which clocking is separately controlled for a plurality of functional units is illustrated. For at least some of the functional units, certain control signals, data instructions, etc. may be monitored to determine the activity level of the particular functional unit, as indicated at 700. If the functional unit is determined to be inactive (702) then clocking may be disabled to that functional unit, as indicated at 704. If needed, certain outputs of the functional unit may be emulated to ensure correctness of operation for other functional units that may receive the outputs for the functional unit for which clocking is disabled, as indicated at 706. The signals for the disabled functional unit are monitored, as indicated at 708, to determine when activity will resume. When activity is to resume, clocking is restored to the functional unit (and emulation, if any, is stopped), as indicated at 710. This procedure as indicated at 700–710 may be performed separately for a plurality of functional units within the integrated device.

What is claimed is:

1. An integrated device, comprising:
a plurality of functional units, wherein each functional unit is configured to receive one or more input signals, perform an operation or task, and produce one or more output signals, wherein each functional unit is configured to be inactive while one or more of the other functional units is active;
a plurality of activity detector and clock control units coupled to said plurality of functional units; wherein each activity detector and clock control unit is associated with a different one of the functional units and configured to predict when its associated functional unit will be inactive;
wherein a first one of the activity detector and clock control units is configured to monitor some or all of the input signals received by and output signals produced by a first one of the functional units to predict when the first functional unit will be inactive;
wherein each activity detector and clock control unit is configured to shut off a clock to its associated functional unit in response to its associated functional unit being predicted to be inactive, and provides the clock to its associated functional unit when its associated functional unit is active.

2. The integrated device as recited in claim 1, wherein the input signals received by the first functional unit comprise control signals for controlling the operation of the first functional unit, and wherein the first activity detector and clock control unit is configured to monitor one or more of the control signals to predict when the first functional unit will be inactive.

3. The integrated device as recited in claim 1, wherein the input signals received by the first functional unit comprise data operated on by the first functional unit, and wherein the first activity detector and clock control unit is configured to monitor the flow of data to the first functional unit to predict when the first functional unit will be inactive.

4. The integrated device as recited in claim 1, wherein the input signals received by the first functional unit comprise instructions to be performed by the first functional unit, and wherein the first activity detector and clock control unit is configured to monitor the instruction flow to the first functional unit to predict when the first functional unit will be inactive.

5. The integrated device as recited in claim 1, wherein a first one of the activity detector and clock control units is further configured to determine if its associated functional unit has been inactive for a threshold amount of time; wherein the first activity detector and clock control unit is configured to shut power off to its associated functional unit if its associated functional unit has been inactive for at least the threshold amount of time and provide power to its associated functional unit if its associated functional unit has not been inactive for at least the threshold amount of time.

6. The integrated device as recited in claim 5, wherein said threshold amount of time is programmable.

7. The integrated device as recited in claim 1, wherein each of the activity detector and clock control units comprises:
- an activity detector configured to predict when the associated functional unit will be inactive; and
- a clock gate coupled to the activity detector and configured to receive a main clock source for the integrated device and provide a functional unit clock source to the associated functional unit;
- wherein the activity detector is configured to control the clock gate to shut off the functional unit clock source for the associated functional unit when the associated functional unit is inactive.

8. The integrated device as recited in claim 1, wherein a first one of the activity detector and clock control units comprises an output emulator configured to drive the output signals for a first one of the functional units to a safe state when the clock is shut off to the first functional unit.

9. A microprocessor, comprising:
- an integer execution unit configured to receive an integer instruction stream and execute integer instructions from the integer instruction stream;
- an floating point execution unit configured to receive a floating point instruction stream and execute floating point instructions from the floating point instruction stream;
- an integer activity detector unit coupled to the integer instruction stream and configured to predict when the integer execution unit will be inactive and shut a clock off to the integer execution unit in response to it becoming inactive, wherein the integer activity detector unit is configured to predict when the integer execution unit will be inactive by predicting when no integer instructions will be presented to the integer execution unit for a threshold amount of time, and wherein the integer activity detector unit is configured to shut the clock off to the integer execution unit in response to said predicting and provide the clock to the integer execution unit when an integer instruction is presented to the integer execution unit; and
- a floating point activity detector unit coupled to the floating point instruction stream and configured to predict when the floating point execution unit will be inactive and shut a clock off to the floating point execution unit when it is inactive.

10. The microprocessor as recited in claim 9, wherein the floating point activity detector unit is configured to predict if no floating point instructions will be presented to the floating point execution unit for a threshold amount of time; wherein the floating point activity detector unit is configured to shut the clock off to the floating point execution unit in response to predicting no floating point instructions will be presented to the floating point execution unit for the threshold amount of time and provide the clock to the floating point execution unit when an floating point instruction is presented to the floating point execution unit.

11. The microprocessor as recited in claim 9, wherein said threshold amount of time is programmable.

12. A microprocessor, comprising:
- an instruction fetch and decode unit configured to fetch and decode microprocessor instructions;
- an instruction scheduler configured to receive an instruction stream from the instruction fetch and decode unit, wherein the instruction scheduler is further configured to buffer the instruction stream and schedule instructions from the instruction stream for execution;
- an integer execution unit configured to receive integer instructions from the instruction scheduler and execute the integer instructions;
- a floating point execution unit configured to receive floating point instructions from the instruction scheduler and execute the floating point instructions;
- an activity detector coupled to the instruction scheduler and configured to monitor the instruction stream to predict a lack of instructions for the integer execution unit for a first threshold amount of time and to predict a lack of instructions for the floating point execution unit for a second threshold amount of time;
- a first clock control unit configured to control a first clock to the integer execution unit, wherein said first clock control unit is configured to shut off the first clock to the integer execution unit in response to the activity detector predicting a lack of integer instructions in the instruction stream for said first threshold amount of time; and
- a second clock control unit configured to control a second clock to the floating point execution unit, wherein said second clock control unit is configured to shut off the second clock to the floating point execution unit in response to the activity detector predicting a lack of floating point instructions in the instruction stream for said second threshold amount of time.

13. The microprocessor as recited in claim 12, wherein the activity detector is configured to monitor the instruction stream to predict a lack of floating point instructions in the instruction stream for at least said second threshold amount of time and control the second clock control unit to shut the second clock off to the floating point execution unit in response to the activity detector predicting the lack of floating point instructions in the instruction stream for at least said second threshold amount of time.

14. The microprocessor as recited in claim 13, wherein the activity detector is configured to monitor the instruction stream to detect the presence of floating point instructions in the instruction stream and control the second clock control unit to restore the second clock to the floating point execution unit when a floating point instruction is scheduled for the floating point execution unit.

15. An integrated device, comprising:
- a first functional unit configured to receive an first input and perform a first operation or task according to the first input;
- a second functional unit configured to receive a second input and perform a second operation or task according to the second input;
- an activity detector configured to monitor some or all of the input signals received by and output signals produced by the first and second functional units to predict when the first function unit will be inactive and when the second functional unit will be inactive;
- a first clock control unit configured to control a first clock to the first functional unit, wherein said first clock control unit is configured to shut off the first clock to the first functional unit in response to the activity detector predicting that the first functional unit will be inactive; and
- a second clock control unit configured to control a second clock to the second functional unit, wherein said second clock control unit is configured to shut off the second clock to the second functional unit in response to the activity detector predicting that the second functional unit will be inactive.

* * * * *